United States Patent
Sugaya

(10) Patent No.: US 10,757,242 B2
(45) Date of Patent: Aug. 25, 2020

(54) COMPUTER SYSTEM, AND METHOD AND PROGRAM FOR SETTING

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 16/065,844

(22) PCT Filed: Mar. 30, 2017

(86) PCT No.: PCT/JP2017/013264
§ 371 (c)(1),
(2) Date: Jun. 25, 2018

(87) PCT Pub. No.: WO2018/179231
PCT Pub. Date: Oct. 4, 2018

(65) Prior Publication Data
US 2020/0014787 A1    Jan. 9, 2020

(51) Int. Cl.
*H04M 3/00*        (2006.01)
*H04M 1/725*       (2006.01)

(52) U.S. Cl.
CPC .... *H04M 1/72527* (2013.01); *H04M 2250/66* (2013.01)

(58) Field of Classification Search
None
See application file for complete search history.

(56) References Cited

U.S. PATENT DOCUMENTS

| 2012/0015641 A1 | 1/2012 | Azuma et al. |
| 2014/0237405 A1* | 8/2014 | Wu .......... G06F 9/451 715/765 |

FOREIGN PATENT DOCUMENTS

| JP | 2004-229213 | 8/2004 | |
| JP | 2004229213 A * | 8/2004 | |
| JP | 2005-198099 | 7/2005 | |
| JP | 2005198099 A * | 7/2005 | ............ G08C 17/00 |
| JP | 2007-129346 | 5/2007 | |
| JP | 2007129346 A * | 5/2007 | |
| JP | 2010-259046 | 11/2010 | |
| JP | 2015-115878 | 6/2015 | |

* cited by examiner

*Primary Examiner* — Jinsong Hu
*Assistant Examiner* — Alexander J Yi
(74) *Attorney, Agent, or Firm* — Lex IP Meister, PLLC

(57) ABSTRACT

The present invention is to provide a computer system, and a method and a program for setting that are capable to easily change the setting of a terminal device in order to improve the convenience. The computer system, in which a setting terminal remotely inputs the setting of a terminal to be set if the setting screen or the screen transition of the setting terminal is different from that of the terminal to be set, receives only a screen view for the setting method of the setting terminal without receiving an input of the setting of the setting terminal to receive an input of the setting for the terminal to be set by the setting method of the setting terminal, acquires the terminal type ID of the terminal to be set, and transmits a setting command associated with the setting for the terminal to be set that is viewed by the setting method of the setting terminal to the terminal to be set, based on the terminal type ID.

6 Claims, 10 Drawing Sheets

COMPUTER SYSTEM, AND METHOD AND PROGRAM FOR SETTING

TECHNICAL FIELD

The present invention relates to a computer system, and a method and a program for setting, in which a setting terminal remotely inputs the setting of a terminal to be set if the setting screen or the screen transition of the setting terminal is different from that of the terminal to be set.

BACKGROUND ART

Recently, terminal devices such as smart phones and tablets have been widespread. In such terminal devices, the users can change various settings to make the terminal device user-friendly. To change the setting, the user who is familiar with the operation of a terminal device may change the setting of the terminal device owned by the user who is unfamiliar with the operation.

However, the setting screen and the change procedure vary with the type of a terminal device. Thus, even if the user is familiar with the operation, it may be difficult to change the setting of the terminal device owned by the user who is unfamiliar with the operation.

It is known that the setting of such terminal device is changed by acquiring information necessary for the setting of the terminal device based on the tag associated with the terminal device (refer to Patent Document 1).

CITATION LIST

Patent Literature

Patent Document 1: JP 2015-115878 A

SUMMARY OF INVENTION

However, the composition of Patent Document 1 has problems where a tag associated with the type of a terminal device should be prepared and where any setting alone cannot be changed and therefore hardly changes the setting of a terminal device easily.

An objective of the present invention is to provide a computer system, and a method and a program for setting that are capable to easily change the setting of a terminal device in order to improve the convenience.

The present invention provides a computer system, in which a setting terminal remotely inputs the setting of a terminal to be set if the setting screen or the screen transition of the setting terminal is different from that of the terminal to be set, including:

a setting view receiving unit that receives only a screen view for the setting method of the setting terminal without receiving an input of the setting of the setting terminal to receive an input of the setting for the terminal to be set by the setting method of the setting terminal;

a terminal type ID acquisition unit that acquires the terminal type ID of the terminal to be set; and a setting command transmission unit that transmits a setting command associated with the setting for the terminal to be set that is viewed by the setting method of the setting terminal to the terminal to be set, based on the terminal type ID.

The present invention provides a computer system, in which a setting terminal remotely inputs the setting of a terminal to be set if the setting screen or the screen transition of the setting terminal is different from that of the terminal to be set, receives only a screen view for the setting method of the setting terminal without receiving an input of the setting of the setting terminal to receive an input of the setting for the terminal to be set by the setting method of the setting terminal, acquires the terminal type ID of the terminal to be set, and transmits a setting command associated with the setting for the terminal to be set that is viewed by the setting method of the setting terminal to the terminal to be set, based on the terminal type ID.

The present invention is the category of a computer system, but the categories of a method, a program, etc., for setting have similar functions and effects.

The present invention can provide a computer system, and a method and a program for setting that are capable to easily change the setting of a terminal device in order to improve the convenience.

DESCRIPTION OF EMBODIMENTS

Embodiments of the present invention will be described below with reference to the attached drawings. However, this is illustrative only, and the technological scope of the present invention is not limited thereto.

Overview of System for Setting 1

Figure 1:
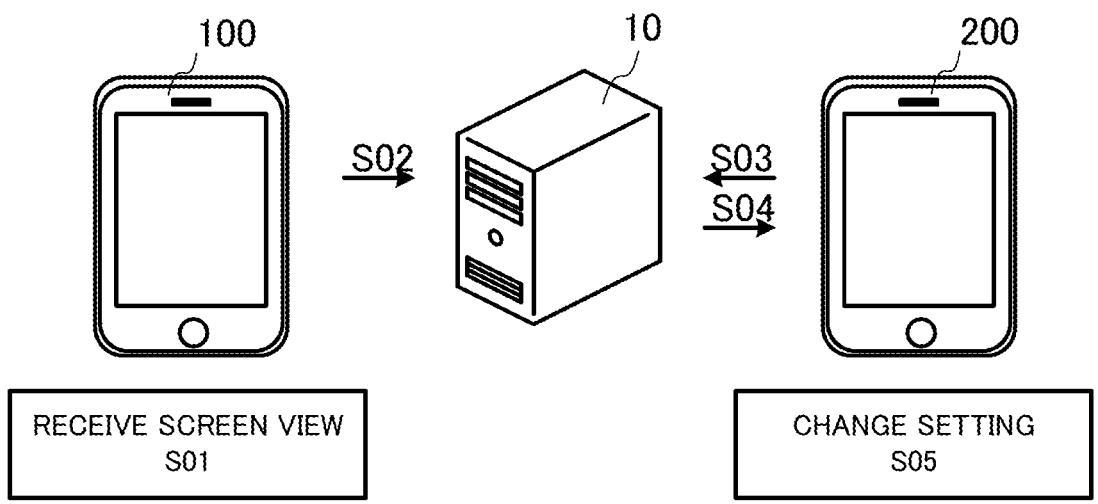
FIG. 1 shows a schematic diagram of the system for setting 1.

A preferable embodiment of the present invention will be described below with reference to FIG. 1. FIG. 1 shows an overview of the system for setting 1 according to a preferable embodiment of the present invention. The system for setting 1 includes a computer 10, a setting terminal 100, and a terminal to be set 200, which is a computer system, in which the setting terminal 100 remotely inputs the setting of the terminal to be set 200 through the computer 10 if the setting screen or the screen transition of the setting terminal 100 is different from that of the terminal to be set 200.

In FIG. 1, the numbers of the computer 10, the setting terminals 100, and the terminals to be set 200 can be appropriately changed. Furthermore, the computer 10, the setting terminal, 100 and the terminal to be set 200 are not be limited to actual devices and may be virtual devices. The processes to be described later may be achieved by any one of or in combination of any two or more of the computer 10, the setting terminal 100, and the terminal to be set 200.

The computer 10 is a computer device data-communicatively connected with the setting terminal 100 and the terminal to be set 200.

The setting terminal 100 is a terminal device data-communicatively connected with the computer 10. The setting terminal 100 is a terminal device, the user of which is familiar with the operation owns. Examples of the setting terminal 100 include electrical appliances such as a mobile phone, a mobile information terminal, a tablet terminal, a personal computer, a net book terminal, a slate terminal, an electronic book terminal, and a portable music player, and wearable terminals such as smart glasses and a head mounted display.

The terminal to be set 200 is a terminal device data-communicatively connected with the computer 10. The terminal to be set 200 is a terminal device, the user of which is unfamiliar with the operation owns. The terminal to be set 200 is an electrical appliance, a wearable terminal, and other articles similar to the above-mentioned setting terminal 100.

The setting terminal 100 receives only a screen view for the setting method of the setting terminal 100 without receiving an input of the setting of the setting terminal 100 to receive an input of the setting for the terminal to be set 200 by the setting method of the setting terminal 100 (Step S01). This means that an input of the setting method of the setting terminal 100 does not change the setting of the setting terminal 100 but views the screen for the setting that enables the terminal to be set 200 to set.

The setting terminal 100 transmits screen view data indicating the received screen view (Step S02). The screen view data include the content of the input that the setting terminal 100 receives, the snapshot image of the viewed screen, and the identifier of the setting terminal 100.

The computer 10 receives the screen view data. The computer 10 acquires the terminal type ID of the terminal to be set 200 (Step S03).

The computer 10 specifies a setting command associated with the setting for the terminal to be set 200 that is viewed by the setting method of the setting terminal 100, based on the acquired terminal type ID and transmits the specified setting command to the terminal to be set 200 (Step S04).

The terminal to be set 200 receives the setting command. The terminal to be set 200 changes its own setting based on this setting command (Step S05).

System Configuration of System for Setting 1

Figure 2:
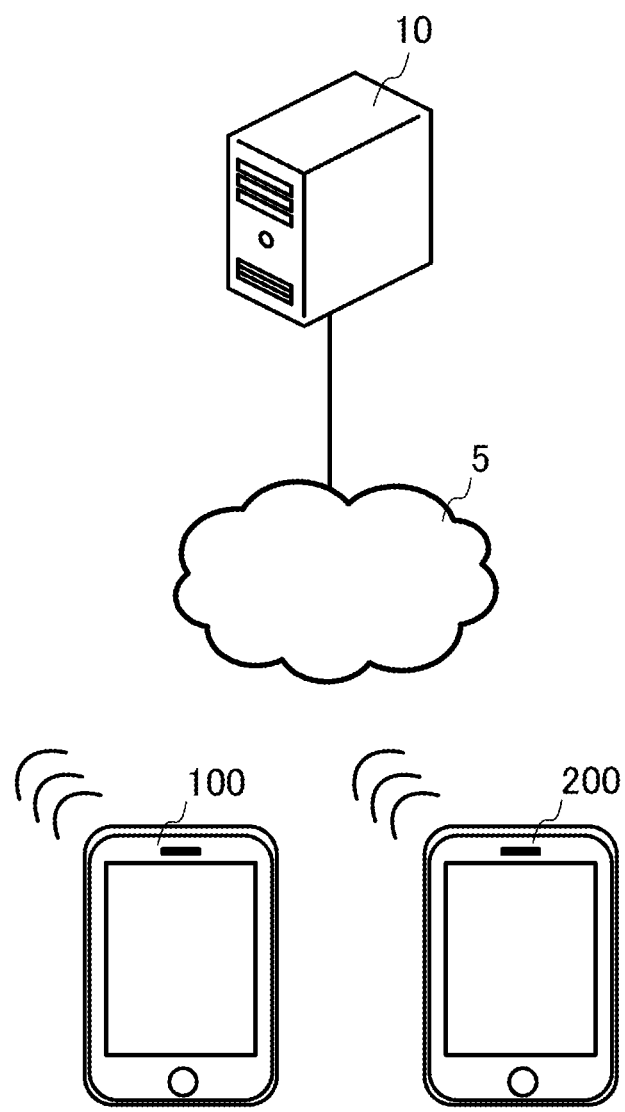
FIG. 2 shows an overall configuration diagram of the system for setting 1.

A system configuration of the system for setting 1 according to a preferable embodiment will be described below with reference to FIG. 2. FIG. 2 shows a block diagram illustrating the system for setting 1 according to a preferable embodiment of the present invention. The system for setting 1 includes a computer 10, a setting terminal 100, a terminal to be set 200, and a public line network 5 (e.g., the Internet network, the third or the fourth generation communication network), which is a computer system, in which the setting terminal 100 remotely inputs the setting of the terminal to be set 200 if the setting screen or the screen transition of the setting terminal 100 is different from that of the terminal to be set 200. In the case where the setting screen or the screen transition of the setting terminal 100 is different from that of the terminal to be set 200, the same setting of the setting terminal 100 as that of the terminal to be set 200 should be input through different setting screens or screen transitions.

The number and the type of devices that compose the system for setting 1 can be appropriately changed. The system for setting 1 may not include actual devices and may be achieved with virtual devices. The processes to be described later may be achieved by any one of or in combination of any two or more of the devices that compose the system for setting 1.

The computer 10 is the above-mentioned computer device with the functions to be described later.

The setting terminal 100 is the above-mentioned terminal device with the functions to be described later.

The terminal to be set 200 is the above-mentioned terminal device with the functions to be described later.

Functions

Figure 3:
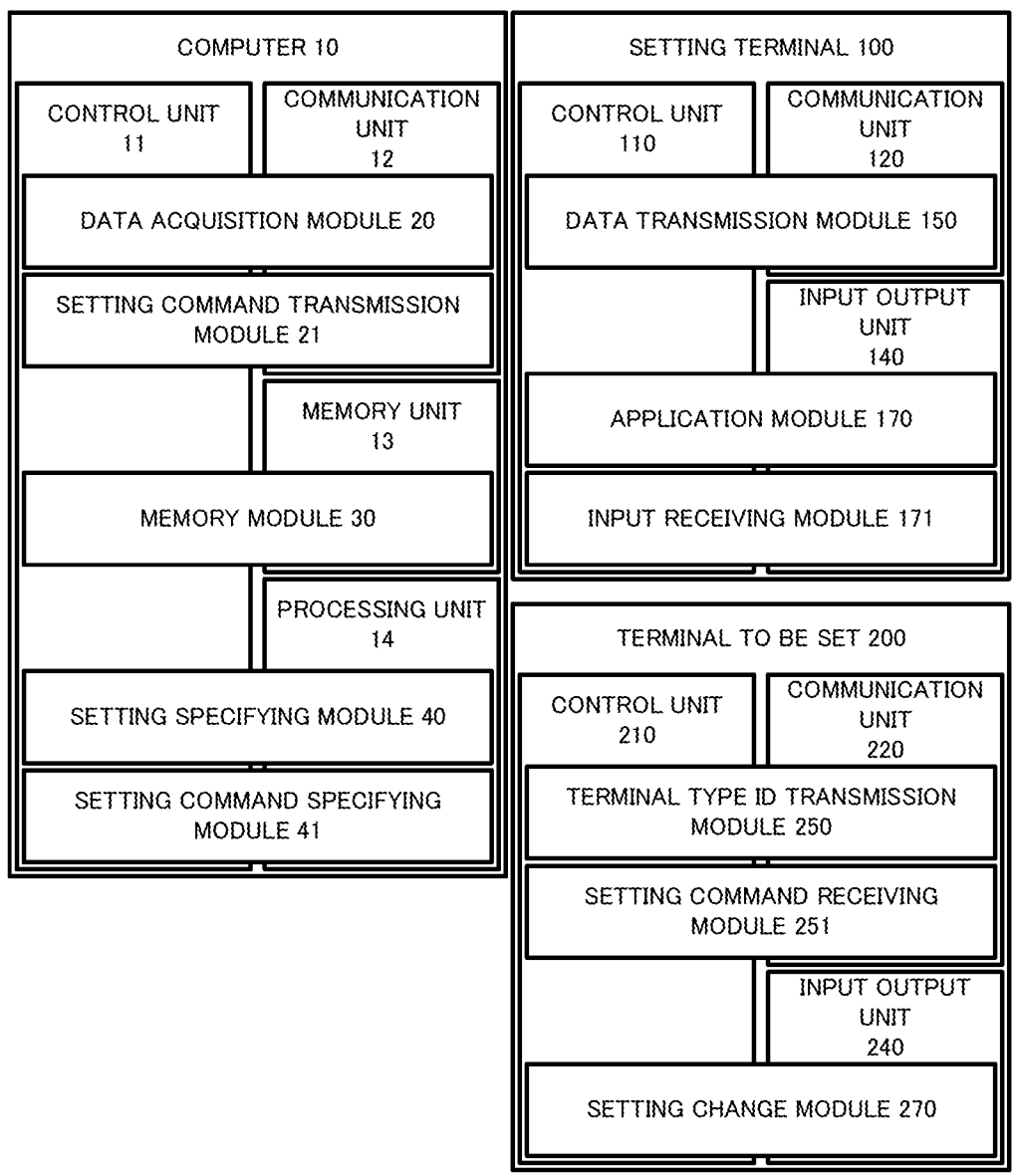
FIG. 3 shows a functional block diagram of the computer 10, the setting terminal 100, and the terminal to be set 200.

The functions of the system for setting 1 according to a preferable embodiment will be described below with reference to FIG. 3. FIG. 3 shows a functional block diagram of the computer 10, the setting terminal 100, and the terminal to be set 200.

The computer 10 includes a control unit 11 provided with a central processing unit (hereinafter referred to as "CPU"), a random access memory (hereinafter referred to as "RAM"), and a read only memory (hereinafter referred to as "ROM"); and a communication unit 12 such as a device that is capable to communicate with other devices, for example, a Wireless Fidelity or Wi-Fi® enabled device complying with IEEE 802.11. The computer 10 also includes a memory unit 13 such as a hard disk, a semiconductor memory, a record medium, or a memory card to store data. The computer 10 also includes a processing unit 14 provided with various devices that perform various calculations, processes, etc.

In the computer 10, the control unit 11 reads a predetermined program to achieve a data acquisition module 20 and a setting command transmission module 21 in cooperation with the communication unit 12. Furthermore, in the computer 10, the control unit 11 reads a predetermined program to achieve a memory module 30 in cooperation with the memory unit 13. Furthermore, in the computer 10, the control unit 11 reads a predetermined program to achieve a setting specifying module 40 and a setting command specifying module 41 in cooperation with the processing unit 14.

The setting terminal 100 includes a control unit 110 including a CPU, a RAM, and a ROM; and a communication unit 120 such as a Wi-Fi® enabled device that is capable to communicate with other devices, in the same way as the computer 10. The setting terminal 100 also includes various devices such as a display unit that outputs and displays data and images processed by the control unit 110, an input unit such as a touch panel, a keyboard, or a mouse that receives an input from the user as an input-output unit 140, and an imaging unit that takes the snapshot image of a screen.

In the setting terminal 100, the control unit 110 reads a predetermined program to achieve a data transmission module 150 in cooperation with the communication unit 120. Furthermore, in the setting terminal 100, the control unit 110 reads a predetermined program to achieve an application module 170 and an input receiving module 171 in cooperation with the input-output unit 140.

The terminal to be set 200 includes a control unit 210 including a CPU, a RAM, and a ROM, a communication unit 220 such as a device that is capable to communicate with other devices, and an input-output unit 240 including various devices such as a display unit and an input unit, in the same way as the setting terminal 100.

In the terminal to be set 200, the control unit 210 reads a predetermined program to achieve a terminal type ID transmission module 250 and a setting command receiving module 251 in cooperation with the communication unit 220. Furthermore, in the terminal to be set 200, the control unit 210 reads a predetermined program to achieve a setting change module 270 in cooperation with the input-output unit 240.

Screen View Data Acquisition Process

Figure 4:
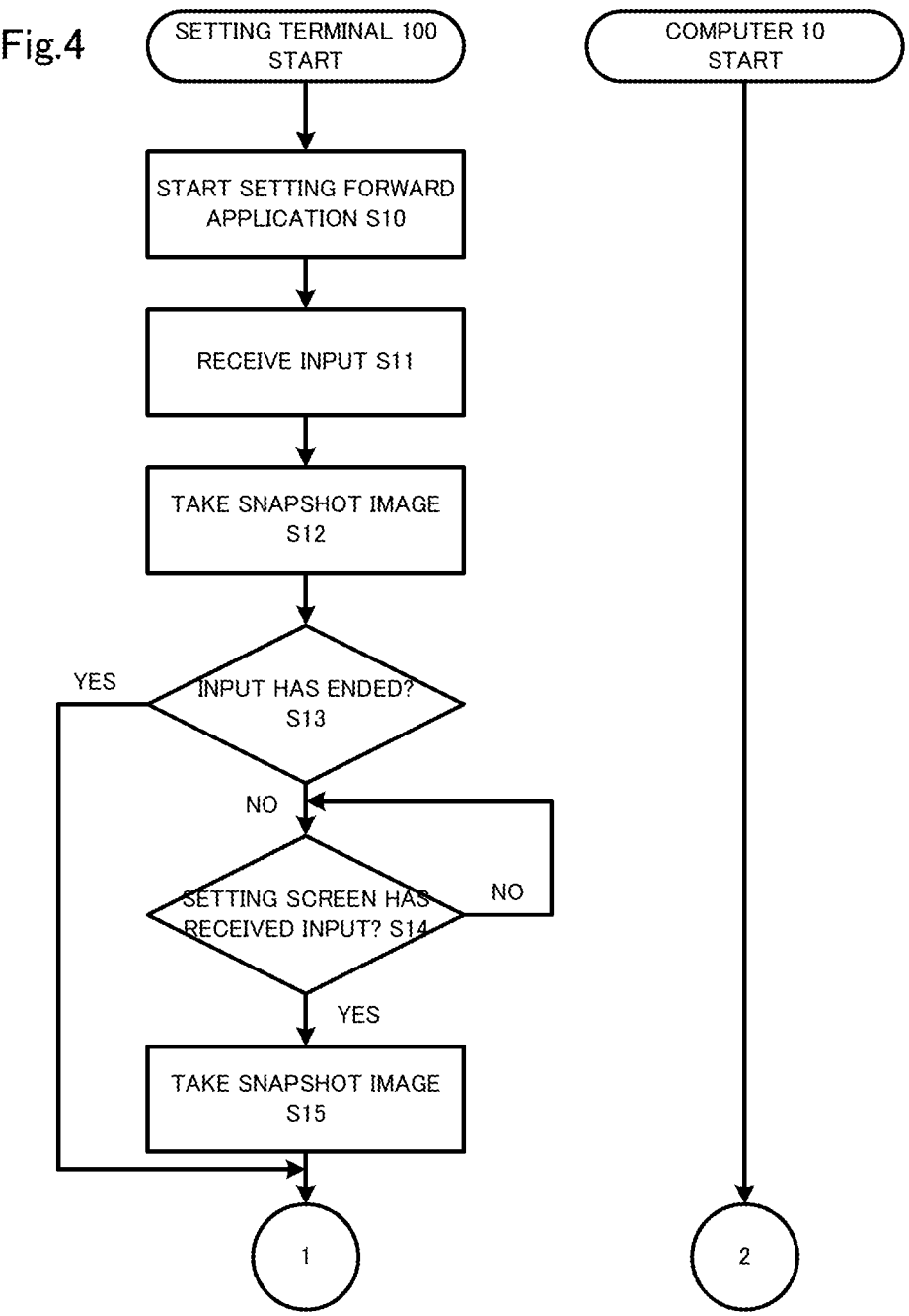
FIG. 4 shows a flow chart illustrating the screen view data acquisition process performed by the computer 10 and the setting terminal 100.
Figure 5:
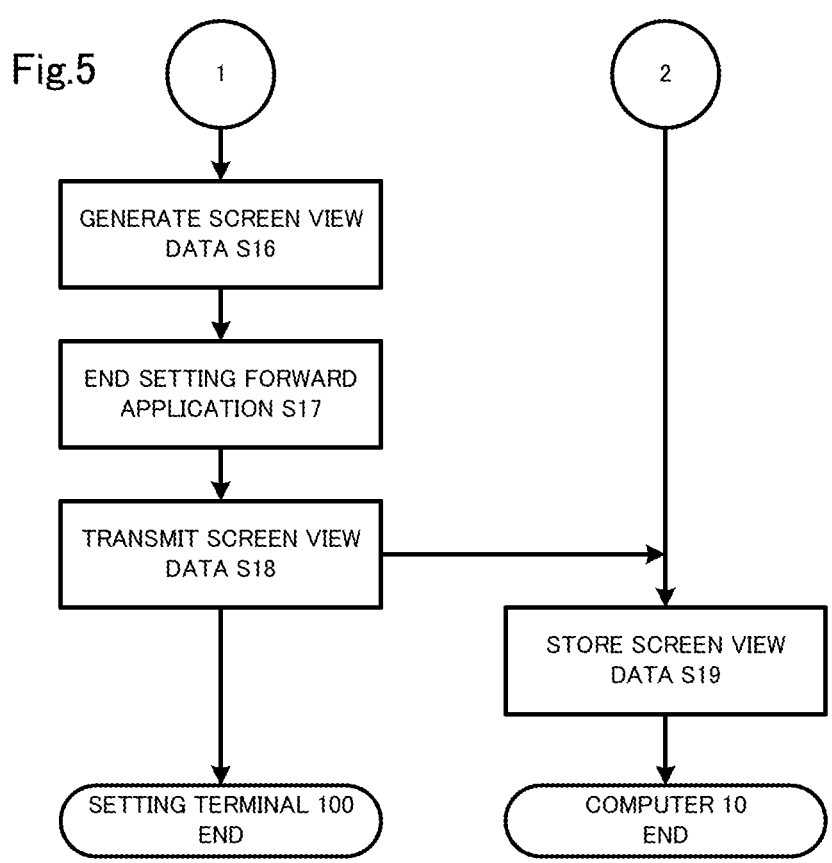
FIG. 5 shows a flow chart illustrating the screen view data acquisition process performed by the computer 10 and the setting terminal 100.

The screen view data acquisition process performed by the setting system 1 will be described below with reference to FIGS. 4 and 5. FIGS. 4 and 5 show a flow chart illustrating the screen view data acquisition process performed by the computer 10 and the setting terminal 100. The tasks executed by the modules of each of the above-mentioned devices will be explained below together with this process.

The application module 170 starts the setting forward application (Step S10). In the step S10, the application module 170 starts the setting forward application that runs in the background. This setting forward application performs a process, for example, to refuse to receive an input of the setting of the setting terminal to take a snapshot screen necessary for the setting that the user inputs as a snapshot image and receive an input by the setting method.

The input receiving module 171 receives an input necessary to display the setting screen as an input of the setting for the terminal to be set 200 (Step S11). In the step S11, the input receiving module 171 displays the first setting screen in response to receipt of an input tapped on the setting icons or the setting items of the setting terminal 100. This first setting screen displays various setting icons or setting items corresponding to two or more setting screen. The input receiving module 171 displays the second setting screen corresponding to the setting icons or the setting item in response to receipt of an input from any one of the setting icons and the setting items. The setting may be input only from the first setting screen.

Figure 7:
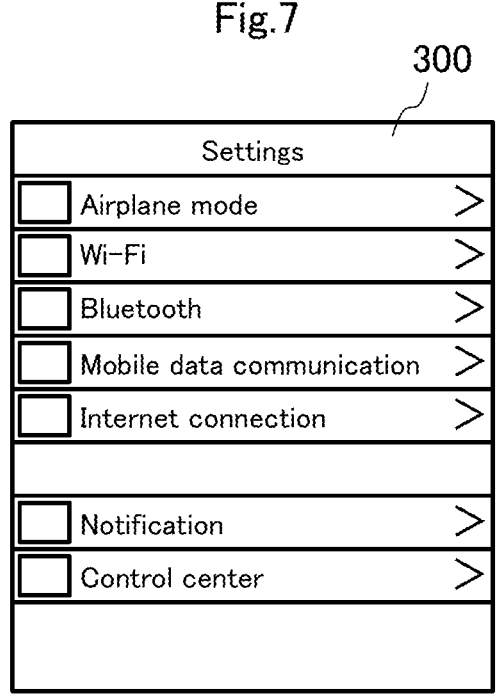
FIG. 7 shows one example of the first setting screen 300.

The first setting screen will be described below with reference to FIG. 7. FIG. 7 shows one example of the first setting screen 300. The first setting screen 300 displays two or more setting icons or setting items, which displays a setting screen corresponding to the setting icons or the setting item in response to receipt of an input from any one of the setting icons and the setting items. At this time, the input receiving module 171 does not receive a change of setting but receives a view of the screen for the setting method.

The application module 170 takes a snapshot image of the setting screen that contains the input (Step S12). In the step S12, the application module 170 takes a snapshot image of the first setting screen 300 that shows an input from the setting icons or the setting items.

Figure 8:
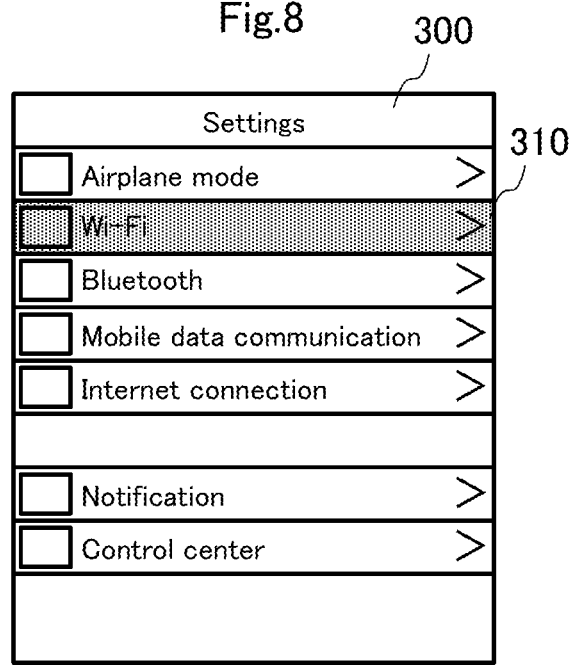
FIG. 8 shows one example of the snapshot image.

The snapshot image will be described with reference to FIG. 8. FIG. 8 shows one example of a snapshot image that the application module 170 takes in the step S13. The application module 170 takes a snapshot image of the first setting screen 300 with a mark that shows an input received from the setting icons or the setting items. For example, the mark fills in a setting item with its content being understandable, or shows a notification for the setting icons or an explanation about whether or not an input received from the setting icons or the setting items inside or outside the first setting screen 300. In FIG. 8, the application module 170 hatches the setting item 310 that has received an input.

The application module 170 judges whether or not an input of the setting has ended (Step S13). In the step S13, the application module 170 judges whether or not the setting has been input by judging whether or not the screen has transited to the second setting screen to be described later. Specifically, if the screen has transited to the second setting screen, the application module 170 judges that the setting is still being input. On the other hand, if not, the application module 170 judges that the setting has been input.

If judging that the setting has been input (YES) in the step S13, the application module 170 performs the step S16 to be described later.

On the other hand, if judging that the setting has not been input (NO) in the step S13, the input receiving module 171 judges whether or not the setting screen has received an input (Step S14). In the step S14, the input receiving module 171 judges whether or not any of the setting icons or the setting items in the second setting screen has received an input. For example, the input is to tap any of the setting icons or the setting items in the second setting screen.

Figure 9:
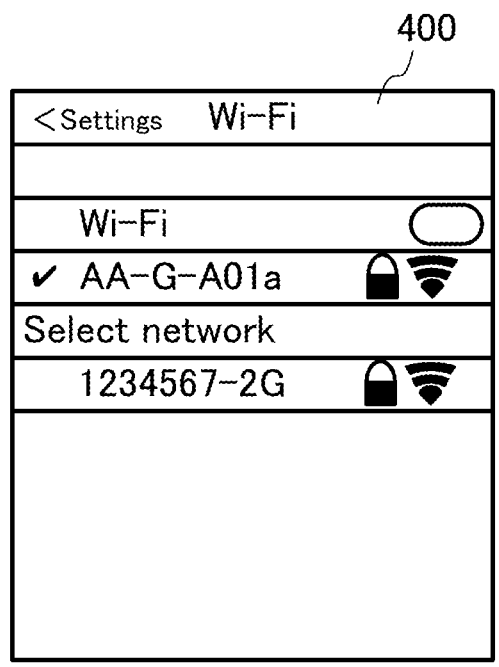
FIG. 9 shows one example of the second setting screen 400.

The second setting screen will be described below with reference to FIG. 9. FIG. 9 shows one example of the second setting screen 400. The second setting screen 400 is displayed from the first setting screen 300 to perform a necessary setting. The second setting screen 400 displays two or more setting icons or setting items, which displays the setting screen corresponding to the setting icons or the setting item in response to receipt of an input from any one of the setting icons and the setting items, in the same way as the above-mentioned first setting screen 300. At this time, the input receiving module 171 does not receive a change of setting but receives a view of the screen for the setting method.

The second setting screen 400 is displayed when an input to a setting icon corresponding to a Wi-Fi® setting among the setting icons of the first setting screen 300 is received. The second setting screen 400 shows an identifier indicating the destination of the Wi-Fi® connection that the setting terminal 100 currently sets (e.g., an icon indicating that the connection is protected by an SSID and a password, an icon indicating Wi-Fi® connection).

In the step S14, if judging that the input receiving module 171 has not received an input (NO), the input receiving module 171 repeats this step until receiving an input.

On the other hand if judging that the input receiving module 171 has received an input (YES) in the step S14, the application module 170 takes a snapshot image of the setting screen that contains this input (Step S15). In the step S15, the application module 170 takes a snapshot image of the second setting screen 400 that shows which the setting icons or the setting item has transmitted the input.

Figure 10:
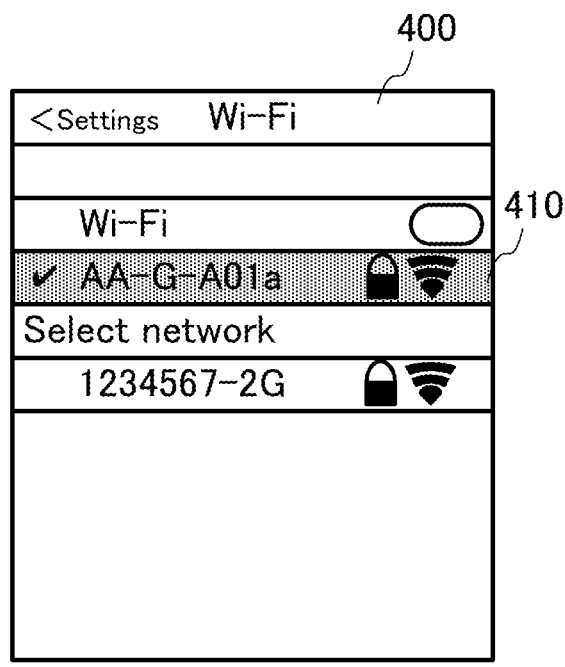
FIG. 10 shows one example of the snapshot image.

The snapshot image will be described with reference to FIG. 10. FIG. 10 shows one example of a snapshot image that the application module 170 takes in the step S15. The application module 170 takes a snapshot image of the second setting screen 400 with a mark that shows an input received from the setting icons or the setting items in the same way as the first setting screen 300. In FIG. 10, the application module 170 hatches the setting item 410 that has received an input.

The above-mentioned description explains only the first and the second setting screens. However, if the setting is not changed on the second setting screen, the present invention takes a snapshot image of the setting screen for completing the setting change by repeating a process similar to the above-mentioned process until the setting is changed.

The application module 170 generates screen view data associated with the snapshot image and the terminal type ID of the setting terminal 100 of the terminal (e.g., the identifier to identify the terminal, the identifier of the manufacturer of the terminal, and the model) (Step S16). In the step S16, if two or more snapshot images exist, the application module 170 contains the order of taking the snapshot images in the screen view data. For example, the order of the snapshot images are determined by generating the screen view data in order of time when the snapshot images were taken or in order of the number assigned when the snapshot images were taken.

The application module 170 ends the setting forward application when the screen view data is generated (Step S17). The application module 170 should not end if the user continues to forward the setting. For example, the application module 170 only has to continue if an input for another setting is received.

The data transmission module 150 transmits the screen view data to the computer 10 (Step S18).

The data acquisition module 20 receives the screen view data. The computer 10 acquires the screen view data by receiving these data.

The memory module 30 stores the screen view data (Step S19).

Command Transmission Process

Figure 6:
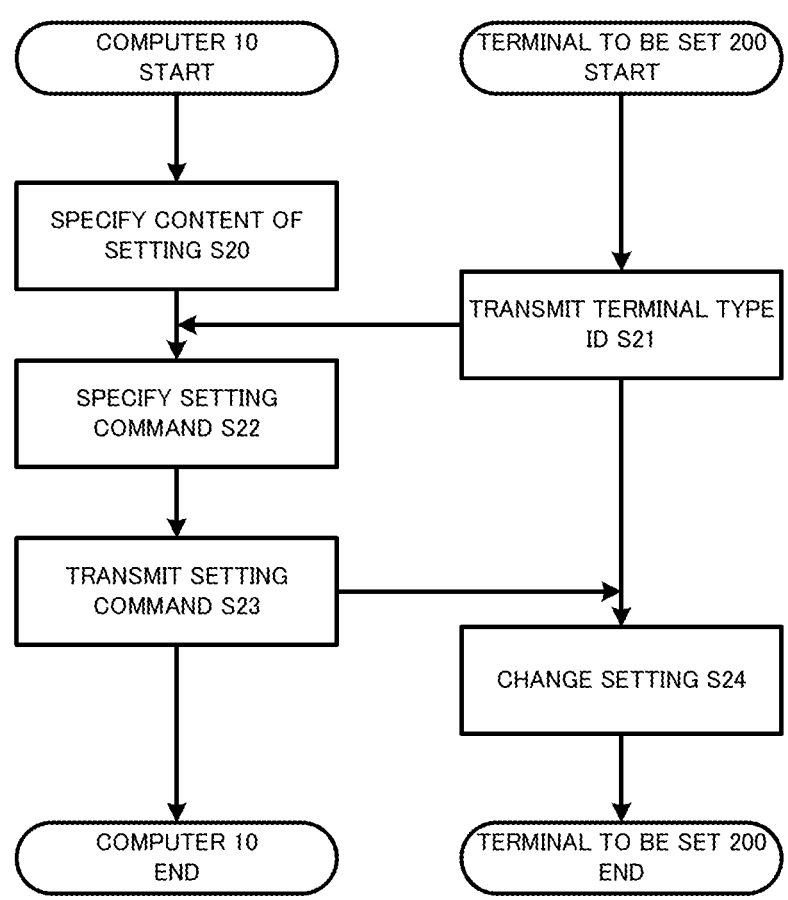
FIG. 6 shows a flow chart illustrating the command transmission process performed by the computer 10 and the terminal to be set 200.

The command transmission process performed by the system for setting 1 will be described below with reference to FIG. 6. FIG. 6 shows a flow chart illustrating the command transmission process performed by the computer 10 and the terminal to be set 200. The tasks executed by the modules of each of the above-mentioned devices will be explained below together with this process.

The setting specifying module 40 specifies what setting the screen view data that the memory module 30 stored in the above-mentioned step S19 actually is by the image analysis (Step S20). In the step S20, for example, the setting specifying module 40 recognizes the contained text by subjecting the snapshot image contained in the screen view data to character recognition and specifies the setting. The setting specifying module 40 also specifies the selected setting item by extracting the feature amount and the feature point of the snapshot image and specifies the setting based on the received input.

The terminal type ID transmission module 250 transmits the terminal type ID to the computer 10 at the request of the computer 10 (Step S21).

The data acquisition module 20 receives the terminal type ID of the terminal to be set 200. The computer 10 acquires the terminal type ID by receiving the terminal type ID of the terminal to be set 200.

The setting command specifying module 41 specifies a setting command associated with the setting for the terminal to be set 200 that is viewed by the setting method of the setting terminal 100, based on the specified setting and the acquired terminal type ID (Step S22). In the step S22, the setting command specifying module 41 specifies a setting command by referring to the terminal setting table stored in the memory module 30 that associates a setting command with the content of a setting and a terminal type ID.

Terminal Setting Table

The terminal setting table stored in the memory module 30 will be described below. The memory module 30 previously associates a setting command with the content of a setting and a terminal type ID and stores the associated data as the terminal setting table. The content of a setting is the setting screen and the change procedure to change the various settings of a terminal. The terminal type ID is as described above. The setting commands are various commands that the terminal to be set 200 performs.

The setting command specifying module 41 specifies the setting command associated with the specified setting and the acquired terminal type ID from the terminal setting table. For example, since the content of the setting specified this time is a setting method of "Wi-Fi® connection," the setting command specifying module 41 identifies the terminal type ID acquired this time among the terminal type IDs associated with the content of this setting. Then, the setting command specifying module 41 specifies a setting command associated with the terminal type ID identified this time.

The setting command transmission module 21 transmits the specified setting command to the terminal to be set 200 (Step S23).

The setting command receiving module 251 receives the setting command. The setting change module 270 changes the setting of the terminal to be set 200 based on this setting command (Step S24). In the step S24, the setting change module 270 automatically changes the setting of the terminal to be set 200 without receipt of input from the user. For example, if viewed in the setting terminal 100, the screen set for entering text in Roman letters through the keyboard is imaged and transmitted to the computer 10. The computer 10 specifies the setting based on the screen and then specifies the setting command (to enter a text in Roman letters through the keyboard) associated with the specified setting and the terminal type ID of the terminal to be set 200. The computer 10 transmits the setting command to the terminal to be set 200. The terminal to be set 200 executes the setting command (to enter a text in Roman letters through the keyboard).

To achieve the means and the functions that are described above, a computer (including a CPU, an information processor, and various terminals) reads and executes a predetermined program. For example, the program may be provided through Software as a Service (SaaS), specifically, from a computer through a network or may be provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

1 System for setting
10 Computer
100 Setting terminal
200 Terminal to be set

What is claimed is:

1. A computer system, in which a setting terminal remotely inputs a setting of a terminal to be set when a setting screen or a screen transition of the setting terminal is different from that of the terminal to be set, comprising:
   a setting view receiving unit that receives only a screen view for a setting method of the setting terminal without receiving an input of a setting of the setting terminal to receive an input of the setting for the terminal to be set by the setting method of the setting terminal;
   an imaging unit that takes a snapshot image of the viewed setting screen;

a setting specifying unit that specifies the content of the setting by analyzing the snapshot image;

a terminal type ID acquisition unit that acquires a terminal type ID of the terminal to be set; and a setting command transmission unit that transmits a setting command associated with the content of the setting that is viewed by the setting method of the setting terminal and specified based on the snapshot image to the terminal to be set, based on the terminal type ID, wherein the snapshot image includes a plurality of snapshot images including a first snapshot image of the setting screen showing a first input of the setting for the terminal to be set and a second snapshot image of the setting screen showing a second input of the setting for the terminal to be set which is performed subsequently to the first input, and wherein the content of the setting includes a change procedure to change the setting of the terminal to be set based on an order of the plurality of snapshot images.

2. The computer system according to claim 1, wherein the setting view receiving unit receives the input of the setting for the terminal to be set on the screen view for the setting method of the setting terminal.

3. A method for setting performed by a computer system, in which a setting terminal remotely inputs a setting of a terminal to be set when a setting screen or a screen transition of the setting terminal is different from that of the terminal to be set, comprising:

receiving only a screen view for a setting method of the setting terminal without receiving an input of a setting of the setting terminal to receive an input of the setting for the terminal to be set by the setting method of the setting terminal;

taking a snapshot image of the viewed setting screen;

specifying the content of the setting by analyzing the snapshot image;

acquiring a terminal type ID of the terminal to be set; and transmitting a setting command associated with the content of the setting that is viewed by the setting method of the setting terminal and specified based on the snapshot image to the terminal to be set, based on the terminal type ID, wherein the snapshot image includes a plurality of snapshot images including a first snapshot image of the setting screen showing a first input of the setting for the terminal to be set and a second snapshot image of the setting screen showing a second input of the setting for the terminal to be set which is performed subsequently to the first input, and wherein the content of the setting includes a change procedure to change the setting of the terminal to be set based on an order of the plurality of snapshot images.

4. The method according to claim 3, wherein receiving only the screen view includes receiving the input of the setting for the terminal to be set on the screen view for the setting method of the setting terminal.

5. A non-transitory computer-readable medium that stores a program for causing a computer system, in which a setting terminal remotely inputs a setting of a terminal to be set when a setting screen or a screen transition of the setting terminal is different from that of the terminal to be set, to execute:

receiving only a screen view for a setting method of the setting terminal without receiving an input of a setting of the setting terminal to receive an input of the setting for the terminal to be set by the setting method of the setting terminal;

taking a snapshot image of the viewed setting screen;

specifying the content of the setting by analyzing the snapshot image;

acquiring a terminal type ID of the terminal to be set; and transmitting a setting command associated with the content of the setting that is viewed by the setting method of the setting terminal and specified based on the snapshot image to the terminal to be set, based on the terminal type ID, wherein the snapshot image includes a plurality of snapshot images including a first snapshot image of the setting screen showing a first input of the setting for the terminal to be set and a second snapshot image of the setting screen showing a second input of the setting for the terminal to be set which is performed subsequently to the first input, and wherein the content of the setting includes a change procedure to change the setting of the terminal to be set based on an order of the plurality of snapshot images.

6. The non-transitory computer-readable medium according to claim 5, wherein receiving only the screen view includes receiving the input of the setting for the terminal to be set on the screen view for the setting method of the setting terminal.

* * * * *